United States Patent
Lutz et al.

(10) Patent No.: US 9,817,661 B2
(45) Date of Patent: Nov. 14, 2017

(54) FLOATING POINT NUMBER ROUNDING

(71) Applicant: ARM LIMITED, Cambridge (GB)

(72) Inventors: David Raymond Lutz, Austin, TX (US); Christopher Neal Hinds, Austin, TX (US); Neil Burgess, Cambridge (GB)

(73) Assignee: ARM Limited, Cambridge (GB)

( * ) Notice: Subject to any disclaimer, the term of this patent is extended or adjusted under 35 U.S.C. 154(b) by 117 days.

(21) Appl. No.: 14/877,003

(22) Filed: Oct. 7, 2015

(65) Prior Publication Data

US 2017/0102939 A1  Apr. 13, 2017

(51) Int. Cl.
- *G06F 7/38* (2006.01)
- *G06F 9/30* (2006.01)
- *G06F 7/483* (2006.01)

(52) U.S. Cl.
CPC ............ *G06F 9/3001* (2013.01); *G06F 7/483* (2013.01); *G06F 9/3016* (2013.01)

(58) Field of Classification Search
CPC .... G06F 7/49973; G06F 9/3001; G06F 7/483; G06F 9/3016
USPC ................................................ 708/495–514
See application file for complete search history.

(56) References Cited

U.S. PATENT DOCUMENTS

| | | | | |
|---|---|---|---|---|
| 5,696,711 | A * | 12/1997 | Makineni | G06F 7/483 708/497 |
| 9,348,557 | B1 * | 5/2016 | Langhammer | G06F 7/483 |
| 2003/0126177 | A1 * | 7/2003 | Kobayashi | G06F 7/552 708/606 |
| 2007/0282938 | A1 | 12/2007 | Abdallah et al. | |
| 2011/0055307 | A1 | 3/2011 | Hurd et al. | |
| 2012/0215822 | A1 | 8/2012 | Nystad et al. | |
| 2013/0304785 | A1 * | 11/2013 | Lutz | H03M 7/28 708/497 |

OTHER PUBLICATIONS

International Search Report and Written Opinion of the International Searching Authority mailed Sep. 29, 2016 in PCT/GB2016/051678, 12 pages.

D. Menard et al, "Floating-to-Fixed-Point Conversion for Digital Signal Processors" *EURASIP Journal on Applied Signal Processing*, vol. 2006, Article ID 96421, Jan. 1, 2006, pp. 1-19.

* cited by examiner

*Primary Examiner* — Tan V. Mai
(74) *Attorney, Agent, or Firm* — Nixon & Vanderhye P.C.

(57) ABSTRACT

A data processing system supports execution of program instructions having a rounding position input operand so as to generate control signals for controlling processing circuitry to process a floating point input operand with a significand value to generate an output result which depends upon a value from rounding the floating point input operand using a variable rounding point within the significand of the floating point input operand as specified by the rounding position input operand. In this way, processing operations having as inputs floating point operands and anchored number operands may be facilitated.

16 Claims, 5 Drawing Sheets

FP Number
sign   exponent        significand (n-bit)
$(-1)^s \times 2^x \quad\quad \times \quad \underbrace{1.}_{\text{hidden bit}} b_0 \; b_1 \; b_2 \; b_3 \, .... \; b_{(n-1)}$
FIG. 2
Anchored Number
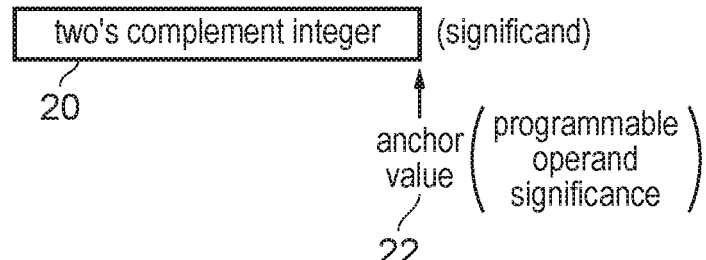
FIG. 3
FRANC Instruction
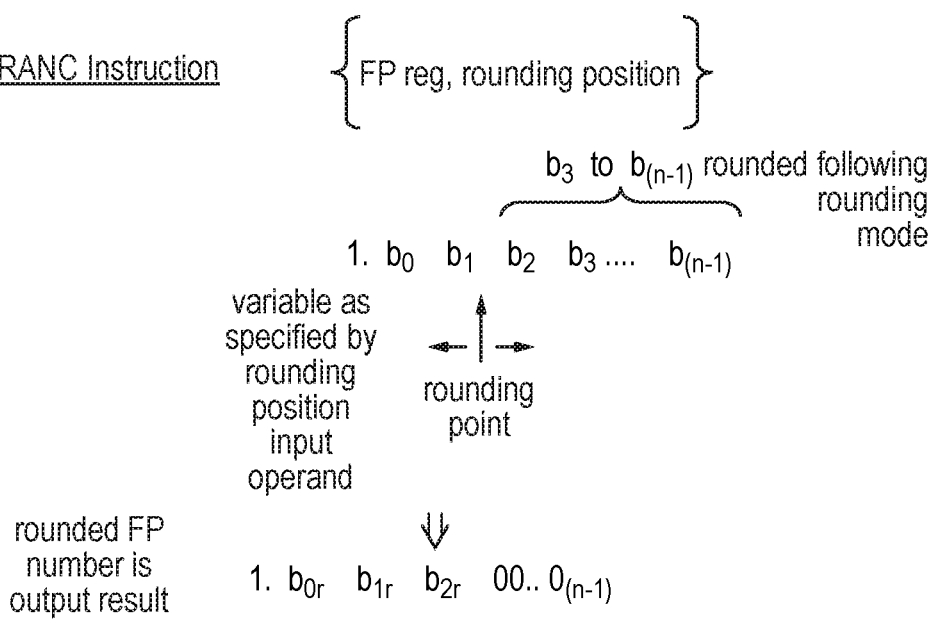
FIG. 4

FLOATING POINT NUMBER ROUNDING

BACKGROUND

This disclosure relates to data processing systems. More particularly, this disclosure relates to data processing systems supporting the use and manipulation of floating point numbers.

Floating point arithmetic has many uses, such as in the generation of manipulation of graphics data, the modelling/ simulation of physical systems and other uses.

It is known to provide data processing systems that support the use of floating point numbers.

SUMMARY

At least some embodiments of the present disclosure provide apparatus for processing data comprising:

processing circuitry to perform processing operations under control of program instructions; and a decoder to decode program instructions to generate control signals to control said processing circuitry to perform said processing operations; wherein said decoder is responsive to a given program instruction and a rounding position input operand to generate control signals to control said processing circuitry to process a floating point input operand having a significand value to generate an output result dependent upon a value from rounding said floating point input operand using a variable rounding point within said significand of said floating point input operand specified by said rounding position input operand.

At least some embodiments of the present disclosure provide apparatus for processing data comprising:

processing means for performing processing operations under control of program instructions; and decoding means for decoding program instructions to generate control signals to control said processing means to perform said processing operations; wherein said decoding means is responsive to a given program instruction and a rounding position input operand to generate control signals to control said processing means to process a floating point input operand having a significand value to generate an output result dependent upon a value from rounding said floating point input operand using a variable rounding point within said significand of said floating point input operand specified by said rounding position input operand.

At least some embodiments of the present disclosure provide a method of processing data comprising:

decoding a given program instruction and a rounding position input operand to generate control signals to control processing circuitry to process a floating point input operand having a significand value to generate an output result dependent upon a value from rounding said floating point input operand rounded using a variable rounding point within said significand of said floating point input operand specified by said rounding position input operand Example embodiments will now be described, by way of example only, with reference to the accompanying drawings in which:

BRIEF DESCRIPTION OF THE DRAWINGS

FIG. 2 schematically illustrates a floating point number;

FIG. 3 schematically illustrates an anchored number;

FIG. 4 schematically illustrates a floating-point-rounding program instruction;

DESCRIPTION OF EXAMPLE EMBODIMENTS

Figure 1:
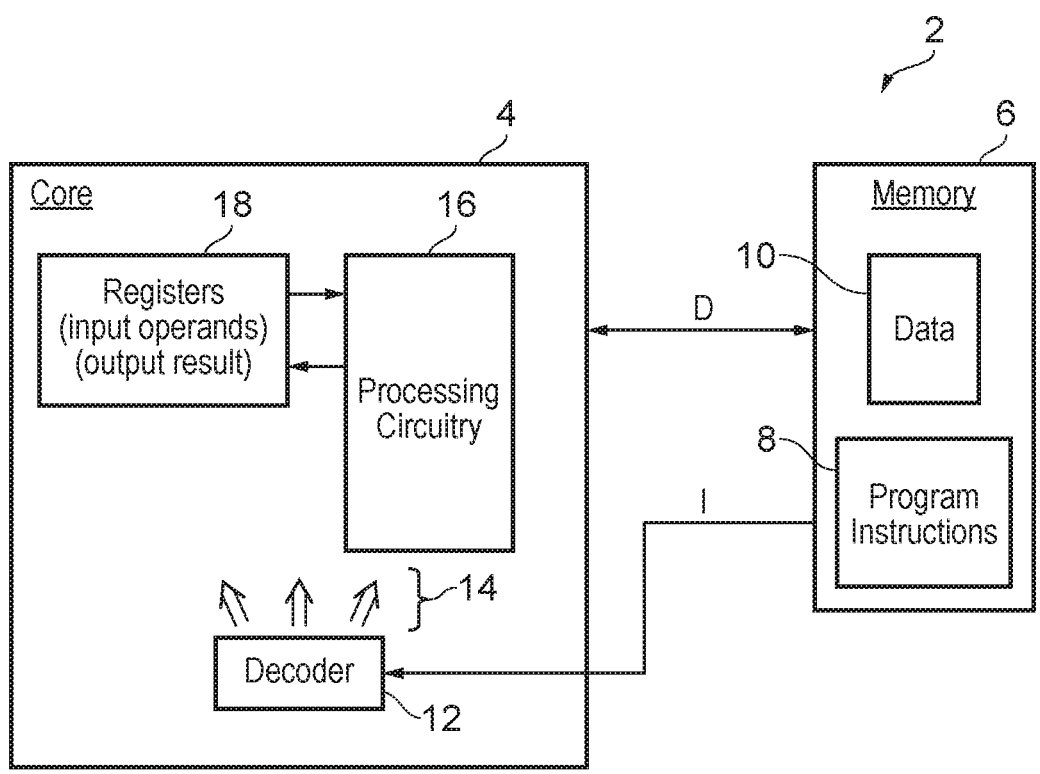
FIG. 1 schematically illustrates a data processing system for executing program instructions to perform data processing operations.

FIG. 1 schematically illustrates a data processing system 2 including a processor core 4 and a memory 6. The memory 6 stores program instructions 8 to be executed and data values 10. The program instructions serve to control the processor core 4 to perform processing operations. The processor core 4 includes a decoder 12 for decoding program instructions fetched from the memory 6 and for generating control signals 14 which serve to control processing circuitry 16 to perform processing operations as specified by those program instructions. The processing circuitry 16 is coupled to a register store 18, which includes multiple registers storing input operands to the program instructions to be executed and storing output results from the program instructions that are executed. The registers within the register store 18 can have a variety of different forms, such as integer registers, floating point registers, anchored number registers, vector registers and the like.

FIG. 2 schematically illustrates a floating point number. A floating point number within a computer system is typically formed of a sign bit s indicating whether the floating point number is positive or negative, an exponent value x indicating the exponent of a power of 2 by which a significand should be multiplied to provide the floating point number being represented. The significand is an n-bit number $b_0$, $b_1$, . . . representing a fractional part of the significand. The significand is formed from a hidden bit and a fraction $b_0$, $b_1$, $b_2$ . . . . The hidden bit is determined by the (biased) exponent and can be either zero or one: zero for a biased exponent, one for any other exponent. Different forms of floating point number representation are possible, such as those consuming different bit widths and allowing different exponent ranges and significand precisions to be represented. The present techniques may be used with all such forms of floating point number representation.

FIG. 3 schematically illustrates an anchored number. An anchored number is a pair (i, a), where i is a long two's complement integer 20 (anchored significand) and a is an anchor value 22 giving the weight of the least significant bit of the integer (and hence the weight of all the bits of the integer). The anchor value provides a programmable operand significance for the two's complement integer 20. The anchored numbers may have a variety of different levels of precision (bits provided in the two's complement integer 20) as well as having a variety of ranges of significance as may be represented by the anchor value 22. Anchored numbers of these various different forms may be used with the present techniques.

FIG. 4 schematically illustrates a floating-point-rounding program instruction that may be used in association with anchored numbers (a FRANC Instruction). This floating-point-rounding program instruction specifies a floating point input operand FPreg giving a register within the register store 18 storing a floating point number to be manipulated. A further input operand of the floating-point-rounding program instruction is a rounding position input operand specifying a bit position within the floating point number to which rounding should be performed. This rounding position input operand accordingly specifies a variable rounding point within the significand of the floating point input operand to be used during a rounding operation. The floating-point-rounding program instruction may have further input operands (e.g. rounding mode).

As illustrated in FIG. 4, the rounding point in the example shown is at the binary position $b_2$, such that the binary digits $b_3$ to $b_{[n-1]}$ are rounded and produce a value which is added to the portion of the floating point significand above and including the binary digit $b_2$, i.e. a value from rounding that is added at the rounding point in order to generate a rounding floating point number as an output result. Thus, as illustrated in FIG. 4, the binary digits $b_3$ to $b_{[n-1]}$ have all been rounded to zero in the output result and the binary digits $b_0$ $b_1$ $b_2$ of the floating-point number input have been subject to the addition of the value from the rounding.

It will be appreciated that a variety of different rounding modes may be used. For example, these rounding modes may include modes in which the rounding is towards zero, away from zero, toward the nearest significant bit, etc. The floating-point-rounding program instruction FRANC may be used in a variety of such rounding modes with the rounding mode employed being specified by a rounding mode parameter. Such a rounding mode parameter may be set, for example, in configuration registers of the processor core 4 as part of the initialization of the data processing system 2.

In some embodiments it is possible that the rounding position input operand may directly specify the bit position within the significand (e.g. $b_2$) of the floating point number to which rounding is to be made by the floating-point-rounding program instruction. Alternatively, in other embodiments, the rounding position input operand may specify a bit significance to which rounding is to be performed independent of the exponent value of the particular floating point number to be manipulated. In this case, the exponent value of the floating point number in question may be compared by the processing circuitry 16 with the rounding position input operand specifying the desired rounding bit significance in order to determine the variable rounding point to be applied to the significand of the floating point number being manipulated.

This second approach may be useful in circumstances where it is desired to mix the use of floating point numbers and anchored numbers. In such systems the anchored numbers will have a significance determined by their anchor value 22. A floating-point-rounding instruction FRANC may be used to round floating point numbers to be, for example, added to anchored numbers so that they have a bit significance matching the anchored numbers. Thus, a floating point number may be prepared for use with anchored numbers by being rounded to a significance matching the anchored number, with the portion of the significand of the floating point number below the least significant portion of the anchored number being represented in the result of the combination as a result of the rounding which is performed upon the more significant portion of the floating point number prior to the combination being made. In these circumstances, the rounding position input operand to the floating-point-rounding program instruction may be provided (either directly or indirectly), by the anchor value 22 of the anchored number with which it is desired to combine the rounded floating point number which will be the output result of the floating-point-rounding program instruction).

Figure 5:
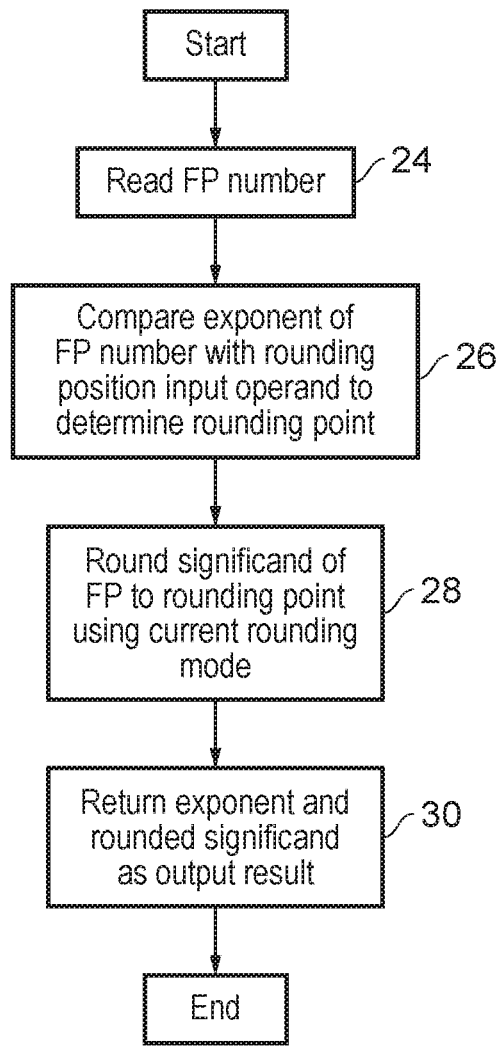
FIG. 5 is a flow diagram schematically illustrating the operation of a floating-point-rounding program instruction.

FIG. 5 is a flow diagram schematically illustrating the operation of the floating-point-rounding program instruction. The processing steps performed may be implemented using the processing circuitry 16 in a variety of different ways. The flow diagram of FIG. 5 shows the processing performed as a linear sequence of operations, but it will be appreciated by those in this technical field that alternative arrangements are possible, such as various of the steps being performed in a different order or in an overlapping fashion.

At step 24 of FIG. 5, a floating point number is read from a floating point register within the register store 18. At step 26 the exponent value x of the floating point number is compared with a rounding position input operand in order to determine a rounding point within the significand of the floating point number. Step 28 performs a rounding of the significand of the floating point number to the rounding point determined at step 26 using the current rounding mode of the data processing system 2. Step 30 returns as the output result, which is a floating-point number consisting of sign, exponent and fraction.

Figure 6:
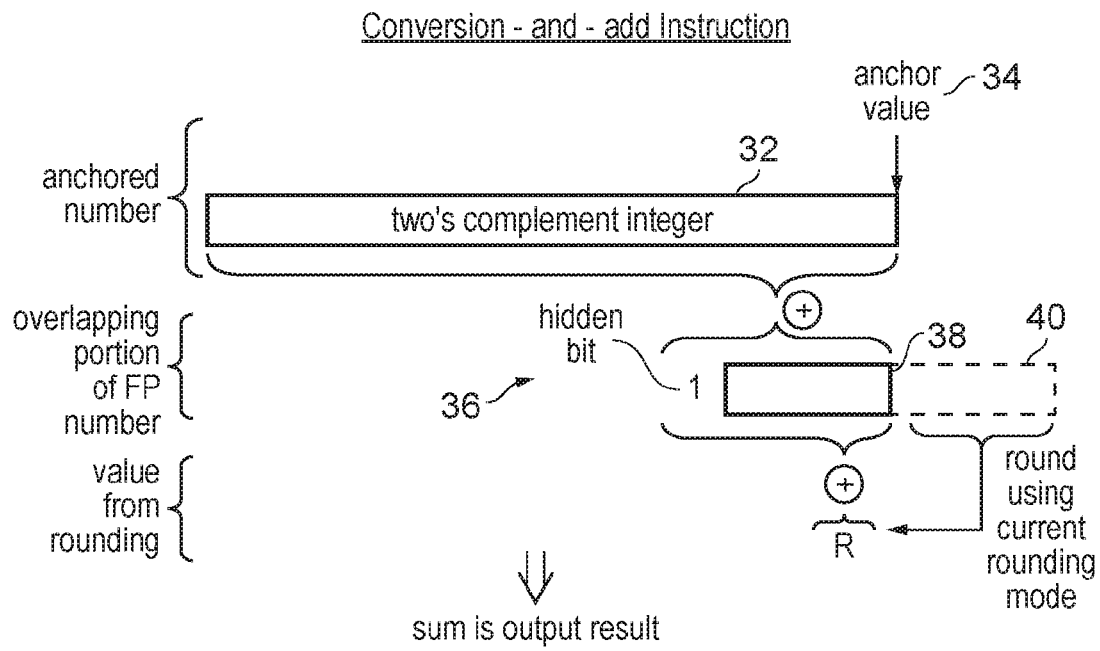
FIG. 6 schematically illustrates the operation of a conversion-and-add program instruction.

FIG. 6 schematically illustrates the operation of a conversion-and-add program instruction in accordance with a different example embodiment of the present disclosure. Such a conversion-and-add program instruction may be used to add a floating point number to an anchored number in combination with rounding of the floating point number to have a significance matching the anchored number. As show in FIG. 6, the anchored number comprises a two's complement integer 32 with an associated anchor value 34 indicating its bit significance. The anchored number serves as one input operand to the conversion-and-add instruction. Another input operand to the conversion-and-add instruction is a floating point number 36. The exponent of this floating point number 36 may be used to determine which portion of the significand of the input floating point number is an overlapping portion 38 which overlaps a least significant bit end of the two's complement integer 32, and which is a non-overlapping portion 40 with a bit significance less than that indicated by the anchor value 34 for the least significance bit within the anchored number. The non-overlapping portion 40 is used to generate a rounding value R in accordance with the rounding mode currently in use by the processor core 4. The conversion-and-add instruction then performs an integer addition of the two's complement integer 32, the overlapped portion 38 of the floating point number (as well as the hidden bit of the floating point number) and the rounding value R, which serves as a carry-in value to the integer addition performed. The result of this integer addition is the output result of the conversion-and-add program instruction.

The rounding position input operand of the conversion-and-add instruction of FIG. 6 may be considered to be the exponent of the floating point number 36. However, in other embodiments where the anchor value 34 and the exponent value of the floating point number are both variable, the rounding position input operand may be considered to be formed of both of these values, or at least the difference between these values.

Figure 7:
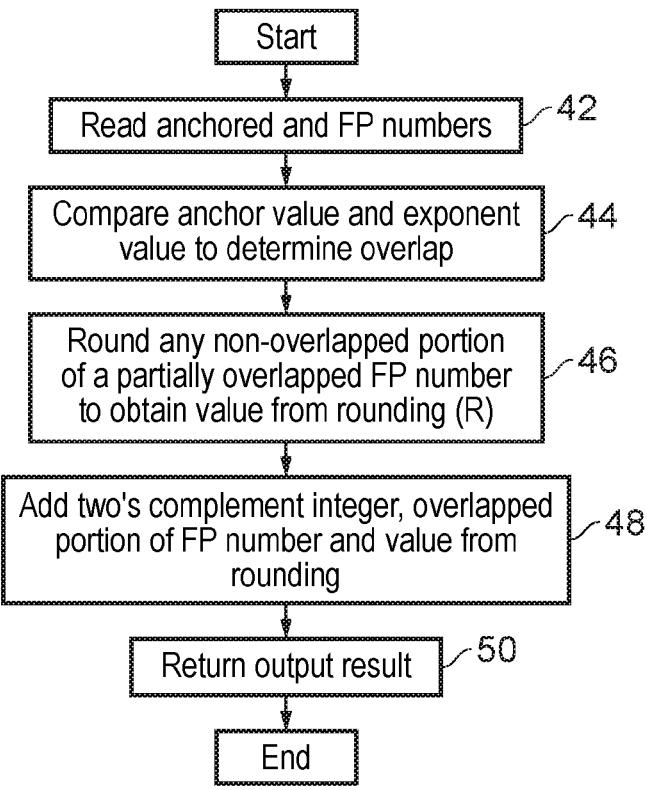
FIG. 7 is a flow diagram schematically illustrating the operation of a conversion-and-add program instruction.

FIG. 7 is a flow diagram schematically illustrating the operation of a conversion-and-add program instruction. As mentioned previously, such a flow diagram is only a schematic representation of the processing performed in executing the conversion-and-add program instruction and other sequences of operations may also be used in different embodiments of the present disclosure.

At step 42 the anchored number and the floating point numbers are read. At step 44 the anchor value of the anchored number is compared with the exponent value of the floating point number to determine the overlap between the anchored number and the floating point number. At step 46 a rounding performed in respect of the non-overlapped portion of a partially overlapped floating point number in accordance with the current rounding mode in order to obtain a value from rounding R. At step 48 the two's complement integer 32 of the anchored number is added to the overlapped portion 38 of the floating point number, with the value from rounding R determined at step 46 used as a carry in input to the addition. Step 50 returns as the output result of the output conversion-and-add program instruction the result of the integer addition performed at step 48.

The value from rounding R may be termed a rounding bit. The value of this rounding bit will vary depending upon both the sign of the floating point number and whether the overlapped portion of the floating point number does or does not require a rounding increment as indicated by the non-overlapped portion 48 of the floating point number. More particularly, the value of the rounding bit may be determined in accordance with the following:

when the overlapped portion is positive and does not require a rounding increment, the rounding bit is +0;
when the overlapped portion is positive and does require a rounding increment, the rounding bit is +1;
when the overlapped portion is negative and does not require a rounding increment, the rounding bit is +1; and
when the overlapped portion is negative and does require a rounding increment, the rounding bit is +0.

Figure 8:
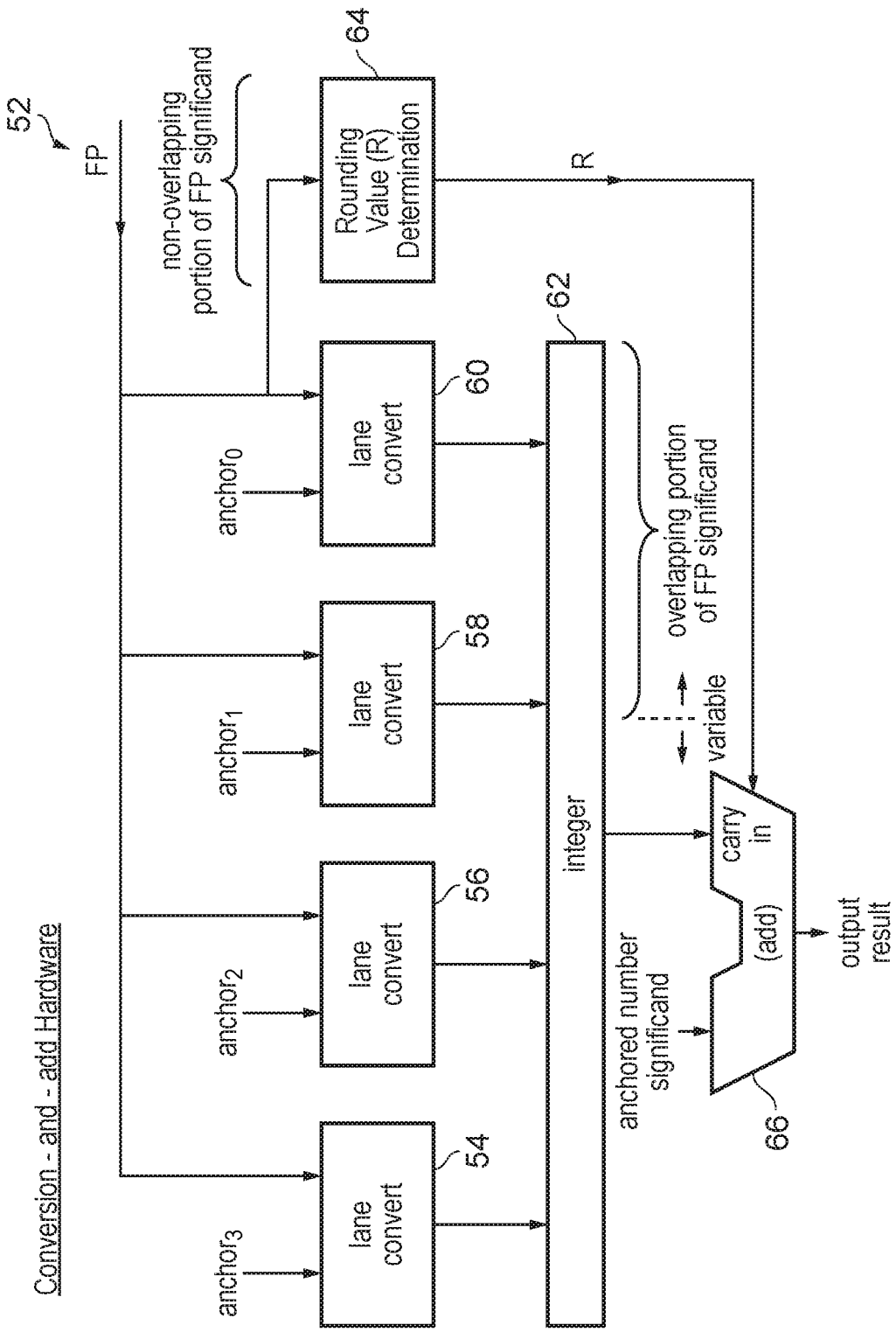
FIG. 8 schematically illustrates an example of hardware for executing a conversion-and-add program instruction.

FIG. 8 schematically illustrates conversion-and-add hardware 52 which may be used to perform the conversion-and-add program instruction. This conversion-and-add hardware 52 may be shared with the SIMD hardware within the data processing system 2 and accordingly may be formed in a manner in which the anchored number is divided into a plurality of lanes, each having their own respective two's complement integer value and anchor value. Lane conversion circuitry 54, 56, 58, 60 associated with each of these lanes serves to identify a portion of an input floating point number which overlaps their respective associated anchor number and to pass this to an integer register 62. Thus, in the integer register 62 there is formed a two's complement integer value corresponding to the overlapped portion 38 of the input floating point number. Each of the lane converters 54, 56, 58, 60 serves to identify its own overlapped portion by comparing its local anchor value with the exponent of the input floating point number.

Associated with the lane converter 62 at the least significant bit end of the floating point number is rounding value determination circuitry 64. This rounding value determination circuitry 64 uses the anchor value $anchor_0$ associated with the least significant lane converter 60 together with the exponent of the input floating point number to identify the non-overlapping portion 40 of the input floating point significand. The rounding value determination circuitry 64 then forms a rounding bit R (value from rounding) using this non-overlapping portion 40 and the currently active rounding mode.

An integer adder 66 performs an integer addition of the overlapped portion 38 of the floating point number as assembled within the integer register 62, the anchored number significand (a two's complement integer) and a carry in value formed of the rounding bit R. The result of the addition by the adder 66 is the output result of the conversion-and-add hardware 52. This output result may be formed of respective lanes representing the anchored number and each having its own two's complement integer value and associated anchor value.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
processing circuitry to perform processing operations under control of program instructions; and
decoding circuitry to decode program instructions to generate control signals to control said processing circuitry to perform said processing operations; wherein
said decoding circuitry is responsive to a given program instruction and a rounding position input operand to generate control signals to: control said processing circuitry to process a floating point input operand having a significand value, and to control said processing circuitry to generate an output result dependent upon a value from rounding said floating point input operand using a variable rounding point within said significand of said floating point input operand specified by said rounding position input operand.

2. The apparatus as claimed in claim 1, wherein said given program instruction is a floating-point-rounding program instruction specifying input operands including said floating point input operand and said rounding position input operand.

3. The apparatus as claimed in claim 2, wherein said value from rounding and said output result are said floating point input operand rounded to said variable point.

4. The apparatus as claimed in claim 2, wherein said floating point input operand has an exponent value and said processing circuitry compares said rounding position input operand with said exponent value to determine said variable rounding point.

5. The apparatus as claimed in claim 2, wherein said processing circuitry performs said rounding in accordance with a rounding mode specified by a rounding mode parameter.

6. The apparatus as claimed in claim 1, wherein said given program instruction is a conversion-and-add instruction that adds said floating point input operand to an anchored input operand with a programmable operand significance.

7. The apparatus as claimed in claim 6, wherein, when said significand of said floating point input operand has a significance range including bits extending from a least significant bit of said anchored input operand to less than said least significant bit of said anchored input operand, said processing circuitry generates said output result corresponding to a sum of said anchored input operand and said significand of said floating point input operand rounded to a rounding point corresponding to said least significant bit of said anchored input operand.

8. The apparatus as claimed in claim 7, wherein said processing circuitry performs an integer addition of a portion of said significand of said floating point input operand overlapping in significance with said anchored input operand, a significand of said anchored input operand and a rounding bit with a significance of said least significant bit of said anchored input operand, said rounding bit being said value from rounding.

9. The apparatus as claimed in claim 8, wherein:
when said portion is positive and does not require a rounding increment, said rounding bit is +0;
when said portion is positive and does require a rounding increment, said rounding bit is +1;
when said portion is negative and does not require a rounding increment, said rounding bit is +1; and
when said portion is negative and does require a rounding increment, said rounding bit is +0.

10. The apparatus as claimed in claim 6, wherein said rounding position input operand is dependent upon said programmable operand significance.

11. The apparatus as claimed in claim 10, wherein said programmable operand significance specifies a least significant bit position of said anchored input operand.

12. The apparatus as claimed in claim 11, wherein said floating point input operand has an exponent value and said processing circuitry compares said programmable operand significance with said exponent value to determine said variable rounding point.

13. The apparatus as claimed in claim 6, wherein said processing circuitry comprises a plurality of processing lanes to execute respective significant portions of said conversion-and-add instruction and a least significant processing lane within said plurality of processing lanes comprises rounding circuitry to provide any rounding for said floating point input operand.

14. The apparatus as claimed in claim 6, wherein said processing circuitry performs said rounding in accordance with a rounding mode specified by a rounding mode parameter.

15. Apparatus for processing data comprising:
processing means for performing processing operations under control of program instructions; and
decoding means for decoding program instructions to generate control signals to control said processing means to perform said processing operations; wherein
said decoding means is responsive to a given program instruction and a rounding position input operand to generate control signals to: control said processing means to process a floating point input operand having a significand value, and to control said processing means to generate an output result dependent upon a value from rounding said floating point input operand using a variable rounding point within said significand of said floating point input operand specified by said rounding position input operand.

16. A method of processing data comprising:
decoding a given program instruction and a rounding position input operand to generate control signals to control processing circuitry to process a floating point input operand having a significand value to generate an output result dependent upon a value from rounding said floating point input operand rounded using a variable rounding point within said significand of said floating point input operand specified by said rounding position input operand.

* * * * *